United States Patent
Chappell et al.

(10) Patent No.: US 12,046,914 B2
(45) Date of Patent: Jul. 23, 2024

(54) WIRELESSLY RECHARGEABLE IN-EAR HEARING DEVICE AND CHARGER FOR SAME

(71) Applicant: GN Hearing A/S, Ballerup (DK)

(72) Inventors: Thomas John Chappell, Frederiksberg (DK); Søren Davids, Jyllinge (DK); Henrik Nielsen, Roskilde (DK)

(73) Assignee: GN HEARING A/S, Ballerup (DK)

( * ) Notice: Subject to any disclaimer, the term of this patent is extended or adjusted under 35 U.S.C. 154(b) by 298 days.

(21) Appl. No.: 17/717,035

(22) Filed: Apr. 8, 2022

(65) Prior Publication Data

US 2022/0393507 A1    Dec. 8, 2022

(30) Foreign Application Priority Data

Jun. 7, 2021  (DK) .......................... PA 2021 70292
Jun. 7, 2021  (EP) .................................. 21178011

(51) Int. Cl.
| | |
|---|---|
| *H04R 25/00* | (2006.01) |
| *H02J 7/00* | (2006.01) |
| *H02J 50/00* | (2016.01) |
| *H02J 50/10* | (2016.01) |

(52) U.S. Cl.
CPC ............ *H02J 50/10* (2016.02); *H02J 7/0044* (2013.01); *H02J 50/005* (2020.01); *H04R 25/554* (2013.01); *H04R 25/602* (2013.01); *H04R 25/609* (2019.05); *H04R 25/652* (2013.01); *H04R 2225/025* (2013.01); *H04R 2225/31* (2013.01)

(58) Field of Classification Search
CPC ........ H02J 50/005; H02J 50/10; H02J 7/0044; H02J 2310/23; H04R 2225/025; H04R 2225/31; H04R 25/554; H04R 25/602; H04R 25/609; H04R 25/652; H04R 1/1025; H04R 2460/17
USPC ........................................................ 381/315
See application file for complete search history.

(56) References Cited

U.S. PATENT DOCUMENTS

| | | |
|---|---|---|
| 6,473,511 B1 | 10/2002 | Aceti et al. |
| 6,658,124 B1 | 12/2003 | Meadows |
| 10,122,220 B2 | 11/2018 | Sankar |
| 10,341,787 B2 | 7/2019 | Blum et al. |
| 2009/0010462 A1 | 1/2009 | Ekchian et al. |
| 2015/0372532 A1 | 12/2015 | Hatanaka et al. |

(Continued)

FOREIGN PATENT DOCUMENTS

| | | |
|---|---|---|
| CN | 110112842 | 8/2019 |
| EP | 2747455 | 6/2014 |

(Continued)

OTHER PUBLICATIONS

Extended European Search Report for EP Patent Appln. No. 21178011.9 dated Dec. 3, 2021.

(Continued)

*Primary Examiner* — Phylesha Dabney
(74) *Attorney, Agent, or Firm* — Vista IP Law Group, LLP

(57) ABSTRACT

The present disclosure relates to a wirelessly rechargeable in-ear hearing device, a charger for a wirelessly rechargeable in-ear hearing device, and a system comprising a wirelessly rechargeable in-ear hearing device and a charger for the wirelessly rechargeable in-ear hearing device.

25 Claims, 6 Drawing Sheets

(56) References Cited

U.S. PATENT DOCUMENTS

| | | |
|---|---|---|
| 2016/0134961 A1 | 5/2016 | Shaffer |
| 2020/0203981 A1 | 6/2020 | Johansen et al. |
| 2020/0367000 A1 | 11/2020 | Husung et al. |
| 2021/0168536 A1 | 6/2021 | Nielsen et al. |
| 2023/0082030 A1* | 3/2023 | Michaelsen ........... H02J 50/005 |
| | | 320/109 |
| 2023/0411999 A1* | 12/2023 | Davids ................ H04R 1/1025 |

FOREIGN PATENT DOCUMENTS

| | | | |
|---|---|---|---|
| EP | 3661231 | 6/2020 | |
| EP | 3836558 A1 * | 6/2021 | ........... H04R 1/1025 |

OTHER PUBLICATIONS

First Technical examination for Danish patent application 2021 70292 dated Dec. 6, 2021.

Further Technical examination for Danish patent application 2021 70292 dated Apr. 7, 2022.

* cited by examiner

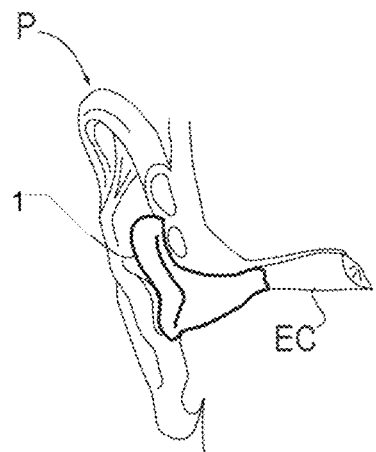
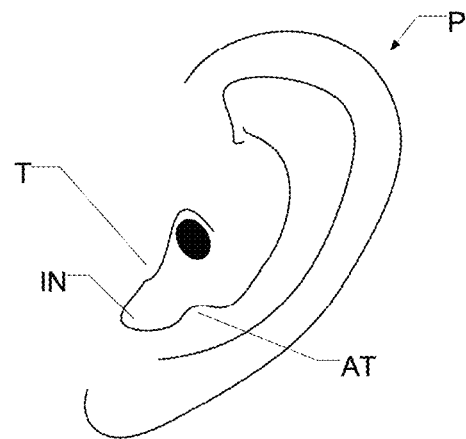
FIG. 1A
FIG. 1B
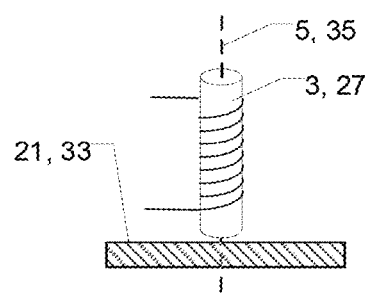
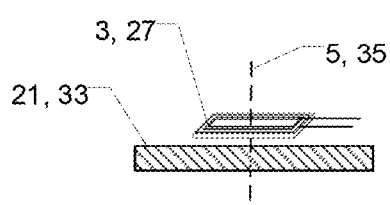
FIG. 2A
FIG. 2B

WIRELESSLY RECHARGEABLE IN-EAR HEARING DEVICE AND CHARGER FOR SAME

RELATED APPLICATION DATA

This application claims priority to, and the benefit of, Danish Patent Application No. PA 2021 70292 filed on Jun. 7, 2021, and European Patent Application No. 21178011.9 filed on Jun. 7, 2021. The entire disclosures of the above applications are expressly incorporated by reference herein.

FIELD

The present disclosure relates to a wirelessly rechargeable in-ear hearing device having inductive charging circuitry comprising a receiver coil, which is positioned adjacent to a sidewall of the hearing device and such that the axial centreline of the receiver coil points through the adjacent hearing device sidewall.

Also, the disclosure relates to a charger for a wirelessly rechargeable in-ear hearing device. The charger has a transmitter coil, which is positioned so as to be adjacent to a holder sidewall and such that the axial centreline of the transmitter coil points through the adjacent holder sidewall.

Further, the disclosure relates to a system comprising a wirelessly rechargeable in-ear hearing device and a charger for the wirelessly rechargeable in-ear hearing device.

BACKGROUND

An in-ear hearing device may be an earphone, a hearing aid (e.g. an invisible-in-canal (IIC), completely-in-canal (CIC), in-the-canal (ITC), or in-the-ear (ITE) hearing aid), an ear plug, or other in-ear hearing device. Such a hearing device contains a plurality of electronic components and circuits that create, process, and/or cancel audible sound for the potential benefit of the user. Some or all of the sound may be digitized and may be altered by one or more of the components and circuits, e.g. the sound may be amplified, filtered, moderated, equalized, adjusted, etc.

The in-ear hearing device has an outer shell, which protects the components within and which is shaped to fit at least partly within an ear canal of the user. When the hearing device is in use and so placed at least partly within the ear canal, its faceplate is oriented towards the outside of the user's ear, i.e. away from the proximal end of the hearing device, which is positioned closest to the eardrum.

The electronic components require power, which is supplied by a battery that may be rechargeable or non-rechargeable. If the battery is not rechargeable, the in-ear hearing device may have a battery door in the faceplate through which the battery can be removed and replaced. Having a battery door in the faceplate imposes significant design restrictions on the in-ear hearing device.

An alternative is wired recharging, wherein the battery is not replaced, but rather recharged by connecting the battery to a charger via an electrical connection, e.g. via conductive contact points.

In a wirelessly rechargeable device, the battery is recharged by inductive charging. A fluctuating magnetic field created by an alternating current in a transmitter coil comprised in a charger induces an alternating electric current in a receiver coil comprised in the hearing device. The alternating current induced in the receiver coil is rectified and used to charge the battery. Thus, by using wireless charging the in-ear hearing device does not need a battery door nor an electrical connection between the battery and a charger.

The strength of the coupling between the receiver coil and the transmitter coil is in part dependent on how well the two coils are aligned and the distance between them. It is thus a technical problem with these devices that the receiver and transmitter coils should be aligned, as well as possible, to achieve and optimise the recharging of the hearing device. Therefore, it is an object to provide a better setup for charging of an in-ear hearing device.

Further, it is desirable that the use of space available within an in-ear hearing device be optimised as the small form-factor poses strong limitations on available space.

SUMMARY

In a first aspect is provided a wirelessly rechargeable in-ear hearing device, in a second aspect is provided a charger for a wirelessly rechargeable in-ear hearing device, and in a third aspect is provided a system comprising a wirelessly rechargeable in-ear hearing device and a charger for the rechargeable in-ear hearing device.

In the first aspect, the wirelessly rechargeable in-ear hearing device comprises a shell, which itself is comprised of one or more hearing device sidewalls and a faceplate surface. The hearing device further comprises a rechargeable battery, one or more hearing device components, and inductive charging circuitry. A receiver coil comprised in the inductive charging circuitry is defined by a receiver coil axial centreline and a receiver coil diameter. One or more of the hearing device sidewalls form an in-ear part, which is configured to being placed at least partially inside an ear canal of a user. The faceplate surface is configured so as to be oriented towards the outside of the user's ear, when the in-ear part is positioned at least partially inside the ear canal. The receiver coil is positioned adjacent to one of the one or more hearing device sidewalls and such that the receiver coil axial centreline points through the adjacent hearing device sidewall.

In-ear hearing devices comprise a shell, which is designed, as one of its functions, to keep substances from the environment surrounding the hearing device, such as ear wax, dirt, water, oil etc., away from the components inside the hearing device. The shell is further designed such that the hearing device can be placed at least partly inside an ear canal of a user with the faceplate surface oriented towards the outside of the ear.

The faceplate will, in some models of in-ear devices, comprise one or more microphone openings and possibly buttons, switches, etc. with which the user can interact with the hearing device, for example to change settings and/or turn the hearing device on/off. In contrast, the sidewalls will usually not contain buttons or switches as these would often be difficult for the user to reach when the in-ear hearing device is in place in the user's ear canal. The faceplate itself may be manufactured as a separate component, which is later combined with the one or more sidewalls or it may be integral with one or more, or all, of the sidewalls. The faceplate may be thick or thin when compared to the rest of the in-ear hearing device and some of the components comprised in the in-ear hearing device may be comprised within the faceplate.

The sidewalls making up the in-ear part may either have a generic shape that allows the hearing device to be placed within the ear of any user or at least a plurality of users, or the sidewalls may, at least in part, be moulded to fit a particular user better in which case the hearing device is referred to as a custom hearing device. The custom hearing device is thus an individually shaped hearing device, wherein the in-ear part is at least partially shaped to conform to a portion of the ear canal of an intended user. Further, at least some of the sidewalls, particularly those comprising the in-ear part, may be made of a material that makes the hearing device more comfortable for the user to wear, such as a material that is soft, and/or hypoallergenic, etc. The in-ear part may further comprise one or more receivers, i.e. speakers.

The hearing device will have one or more functionalities related to hearing, such as one or more functionalities, which act to shield the user's ear canal from certain sounds, or one or more functionalities to aid users with hearing loss. Thus, the hearing device may be a hearing aid.

Inductive charging circuitry is circuitry configured for charging a battery wirelessly using magnetic induction. The inductive charging circuitry comprised in the hearing device comprises a receiver coil, also referred to as an Rx coil. The receiver coil may, for example, be a bar coil, i.e. a solenoid with a magnetic core, also known as a rod coil, or it may be an air core coil, such as a solenoid without a magnetic core, or a flat coil. The bar coil has a higher efficiency than the air core coil and the flat coil and in a preferable embodiment, the receiver coil is a bar coil. The receiver coil may have any shape suitable for its use as an induction coil, such as a cylinder, oval cylinder, rectangular/oblong cylinder, flat, etc.

The axial centreline, also referred to as the axial line, of the receiver coil extends through the centre of the receiver coil and along its magnetic axis. For inductive charging, a receiver coil and a transmitter coil must couple, such that a fluctuating, i.e. time-varying, magnetic field created by the transmitter coil will result in an alternating electric current in the receiver coil. The strength of this coupling is in part dependent on how well the axial centrelines of the receiver and transmitter coils are coaxially aligned and the distance between the two induction coils, such as the distance between the centres of mass of the two induction coils.

Unless a magnetic shielding is placed on or near the receiver coil, see more on this below, the receiver coil may be able to couple inductively equally well whether the transmitter coil is positioned at either end of the receiver coil with respect to its axial centreline. However, due to the distance constraint on the coupling, the receiver coil in a hearing device will, in practice, only be able to couple inductively to a transmitter coil positioned close to the end of the receiver coil closest to the outside of the hearing device as the transmitter coil is not part of the hearing device and is positioned outside of the hearing device.

The axial centreline of the receiver coil may be perpendicular to the adjacent sidewall, but it is more likely that the angle between the axial centreline and the adjacent sidewall will deviate from a 90 degree angle, at the very least due to deviations introduced during manufacturing, but also possibly as technical design choice. Thus, in some embodiments, the receiver coil is positioned such that the receiver coil axial centreline has an angle of between 75 to 105 degrees, such as between 80 to 100 degrees, such as between 85 to 95 degrees, with respect to the adjacent hearing device sidewall.

In some in-ear hearing devices the faceplate surface will to some extent be nearly flat and in such in-ear hearing devices, the axial centreline of the receiver coil may be parallel or close to parallel to the faceplate surface.

The diameter of the receiver coil and transmitter coil is the diameter as commonly defined for the type of induction coil used as receiver and/or transmitter coil. It may be possible for a given coil to have defined both an inner and an outer diameter, but for the purposes of the in-ear hearing devices where size is an important factor, it is the outer diameter that is referred to here. In some embodiments, the diameter of the receiver coil is between 1 mm and 12 mm, for example between 3 mm and 10 mm, for example between 5 mm and 8 mm, or for example between 6 mm and 7 mm. The smaller the in-ear hearing device, the smaller the required maximum form factor of the receiver coil will be with the harshest requirement being for hearing devices of the CIC-type, i.e. where the entire functional part of the hearing device is placed within the ear canal with the intent that the hearing device is nearly invisible except for possibly a tiny pull out wire showing outside of the ear canal.

The receiver coil is positioned adjacent to a sidewall of the hearing device and such that it's axial centreline points through the adjacent sidewall, i.e. the axial centreline, when extended from the coil towards the adjacent sidewall, will intersect the adjacent sidewall unless the receiver coil is positioned within a through-hole in the adjacent sidewall. As the axial centreline extends through the centre of the coil and along its magnetic axis, the receiver coil is able to couple with a transmitter coil outside the hearing device. The receiver coil may be configured and positioned so as to be able to inductively couple to a transmitter coil positioned adjacent to the adjacent hearing device sidewall. The adjacent sidewall may comprise an indentation or a through-hole in which the receiver coil is at least partly positioned. In some embodiments, the adjacent sidewall is part of the faceplate.

In some embodiments, the receiver coil is positioned, in relation to the rechargeable battery, next to a side of the battery that does not face the faceplate surface. The placement next to a side of the battery does not mean that the receiver coil is adjacent to the side of the battery, but it may be. The receiver coil may be some distance away from the side of the rechargeable battery.

A magnetic shielding will often be positioned and configured so as to block and/or divert the magnetic flux from the receiver coil and transmitter coil such that the potential effect of the magnetic flux on other components of the hearing device is diminished. Such a magnetic shielding may preferably be positioned so as to shield the "back-end" of the receiver coil, i.e. to shield the side distal to the end configured to face towards the outside of the hearing device and towards a transmitter coil.

It may be advantageous for the receiver coil to be positioned in a part of the in-ear hearing device, which has similar features across different models and/or customizations.

For example, an in-ear hearing device may be shaped so as to have a part of its shell positioned in and/or near the intertragal notch of a user's ear. Thus, in some embodiments, the shell further comprises a tragal hearing device sidewall configured to being positioned adjacent to the tragus, antitragus and/or intertragal notch of the user's ear, when the in-ear part is positioned at least partly within the ear canal, and wherein the receiver coil is positioned adjacent to the tragal hearing device sidewall.

In the second aspect, the charger for a wirelessly rechargeable in-ear hearing device comprises a charger casing, and inductive charging circuitry arranged within the charger casing. The circuitry comprises a transmitter coil, also referred to as a Tx coil, which is defined by a transmitter coil axial centreline and a transmitter coil diameter. The charger further comprises a holder located within the charger casing.

The holder comprises one or more holder sidewalls, which are configured for receiving the in-ear hearing device and to support the shape of the in-ear hearing device in a predetermined position, i.e. the shape of one or more of the holder sidewalls correspond to the shape of a part of the in-ear hearing device. The transmitter coil is positioned so as to be adjacent to a holder sidewall and such that the transmitter coil axial centreline points through the adjacent holder sidewall.

In the second aspect, the terms and features relate to the terms and features having the same name in the first aspect and third and therefore the descriptions and explanations of terms and features given above apply also to the second aspect.

The transmitter coil is positioned adjacent to a sidewall of the holder and such that its axial centreline points through the adjacent sidewall. The adjacent holder sidewall is configured to being adjacent to a hearing device sidewall, when the charger is in use and the in-ear hearing device is in the predetermined position. This allows for the transmitter coil to be positioned and configured such that it is able to couple to a receiver coil within the in-ear hearing device, when it is positioned in the holder in the predetermined position.

The adjacent holder sidewall may comprise an indentation or a through-hole in which the transmitter coil is at least partly positioned.

The transmitter coil does not have the same size restraints as the receiver coil, as the transmitter coil is positioned in the charger, which may impose a size restraint on the transmitter coil. The transmitter coil may be larger than the receiver coil it is meant to couple with. Although it may be possible for a given coil to define both an inner and an outer diameter, for the purposes of the transmitter coil in a charger for an in-ear hearing device it is the outer diameter that is referred to here. In some embodiments, the diameter of the transmitter coil is between 3 mm and 30 mm, for example between 4 mm and 20 mm, for example between 5 mm and 15 mm, for example between 6 mm and 15 mm, or for example between 10 mm and 15 mm.

In some embodiments, the transmitter coil is configured and positioned so as to be able to inductively couple to a receiver coil positioned adjacent to the hearing device sidewall.

In some embodiments, the transmitter coil is a bar coil or an air core coil. A bar coil has a material placed within the coil to increase the inductance of the induction coil, usually a magnetic core of a ferromagnetic or ferrimagnetic material, whereas an air core coil within its centre has only air or one or more other materials, which do not act to increase the inductance. The induction coil may be a flat coil.

The transmitter coil may have any shape suitable for its use as an induction coil, such as a cylinder, oval cylinder, rectangular/oblong cylinder, flat, etc.

A magnetic shielding may be positioned and configured so as to block and/or divert the magnetic flux from the receiver coil and transmitter coil such that potentially negative effects of the magnetic flux on other components of the hearing device are diminished. Such a magnetic shielding may preferably be positioned so as to shield the "back-end" of the transmitter coil, i.e. to shield the end distal to the end configured to face towards a receiver coil.

In some embodiments, the transmitter coil is positioned such that the transmitter coil axial centreline (35) has an angle of between 75 to 105 degrees, such as between 80 to 100 degrees, such as between 85 to 95 degrees, with respect to the adjacent holder sidewall.

In some embodiments, the holder has been moulded at least partly to the shape of a custom hearing device. A custom hearing device has hearing device sidewalls, which are, at least in part, moulded to fit a particular user better. The custom hearing device is thus an individually shaped hearing device, wherein the in-ear part is at least partially shaped to conform to a portion of the ear canal of an intended user. Thus, the support of the shape of a custom in-ear hearing device may be improved by the holder being at least partly moulded to the shape of the custom in-ear hearing device. Such moulding to support the individual shape of a custom in-ear hearing device may also make it easier for the user to correctly position the custom in-ear hearing device in the predetermined position.

In the third aspect is provided a system comprising a wirelessly rechargeable in-ear hearing device according to the first aspect and a charger for the wirelessly rechargeable in-ear hearing device according to the second aspect.

In the three aspects, the terms and features relate to the terms and features having the same name in the other aspects and therefore the descriptions and explanations of these given in one aspect apply to those in another aspect.

The receiver coil in the wirelessly rechargeable in-ear hearing device and the transmitter coil in the charger are positioned such that the receiver coil is able to inductively couple to the transmitter coil, when the wirelessly rechargeable in-ear hearing device is placed in the charger in the predetermined position.

In some embodiments, the receiver coil and the transmitter coil are configured such that the distance between the centre of mass of the receiver coil and the centre of mass of the transmitter coil is less than or equal to 5.0 mm, such as less than or equal to 4.0 mm, such as less than or equal to 3.0 mm, such as less than or equal to 2.0 mm, when the wirelessly rechargeable in-ear hearing device is placed in the charger in a predetermined position.

Ideally, the receiver and transmitter coils are coaxially aligned such that the axial centrelines of the receiver coil and transmitter coil are parallel and aligned. However, a perfect coaxial alignment of the two coils is not necessary for the coupling and some deviation from the ideal is permissible.

In some embodiments, the receiver coil diameter is smaller than the transmitter coil diameter. The larger the two coils are, the less significance a deviation from a coaxial alignment has. The size of the receiver coil is to a large degree determined by the available space within the in-ear hearing device and so it is difficult to increase the size of the receiver coil beyond the constraints of the volume and space within the in-ear hearing device. The transmitter coil, which is positioned in a charger, however, do not have the same constraints and the transmitter coil may advantageously have a larger diameter than the receiver coil.

BRIEF DESCRIPTION OF THE DRAWINGS

In the following, exemplary embodiments of the invention are described in more detail with reference to the appended drawings, wherein:

FIG. 1A illustrates an in-ear hearing device positioned within the ear canal of a user, FIG. 1B illustrates features of an ear, FIGS. 2A and 2B illustrate examples of induction coils positioned adjacent to a sidewall, FIGS. 3-5 schematically illustrate a wirelessly rechargeable in-ear hearing device in accordance with exemplary embodiments of the invention, FIGS. 6A and 6B schematically illustrate examples of positioning of a receiver coil or transmitter coil in accordance with exemplary embodiments of the invention.

DETAILED DESCRIPTION

Figure 3:
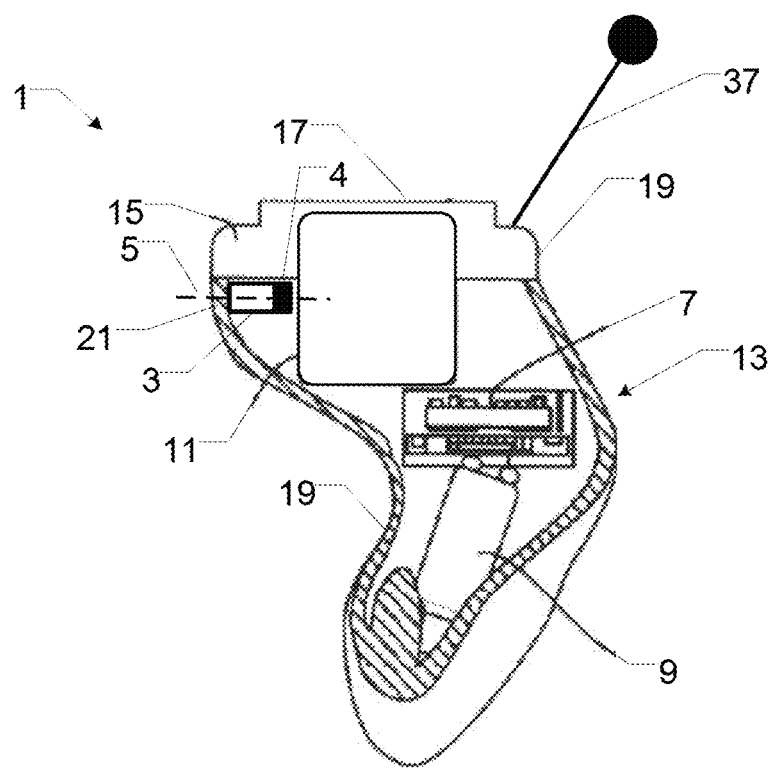

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

In the following various exemplary embodiments of the disclosed wirelessly rechargeable in-ear hearing device, charger for a wirelessly rechargeable in-ear hearing device, and system comprising wirelessly rechargeable in-ear hearing device and charger for wirelessly rechargeable in-ear hearing device are described with reference to the appended drawings.

FIG. 1A shows the pinna P of a user's ear as well as parts of the inner ear, and illustrates an in-ear hearing device 1 positioned within the ear canal, EC. FIG. 1B shows parts of the pinna P, which will be referenced later: The tragus T and anti-tragus AT separated by the intertragal notch IN.

FIGS. 2A and 2B show induction coils 3, 27 positioned adjacent to a sidewall 21, 33. In FIG. 2A is shown an example of a bar coil, while FIG. 2B shows an example of an air core coil. The induction coils 3, 27 are defined in part by a coil axial centreline 5, 35, which points through the adjacent sidewall 21, 33.

Figure 4:
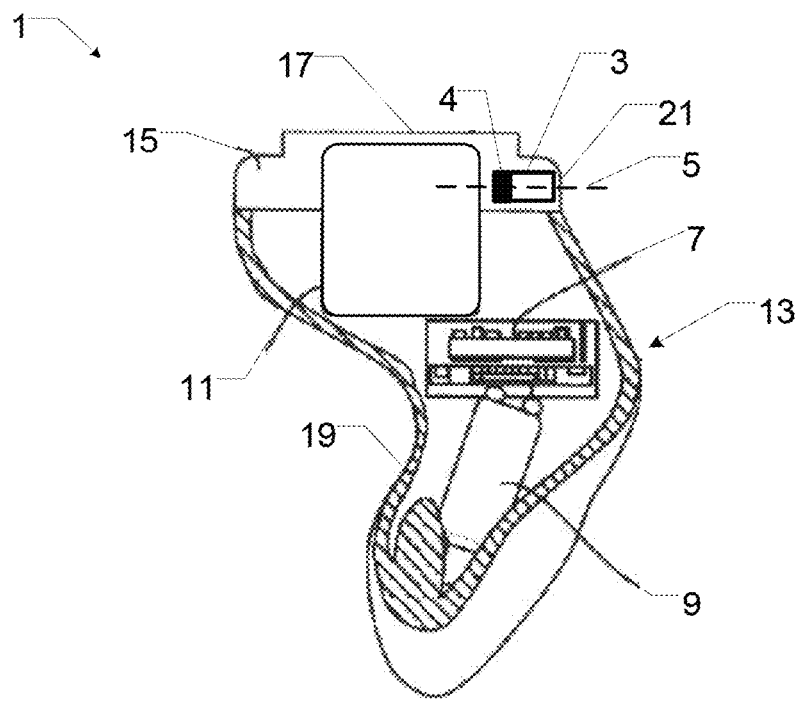
Figure 5:
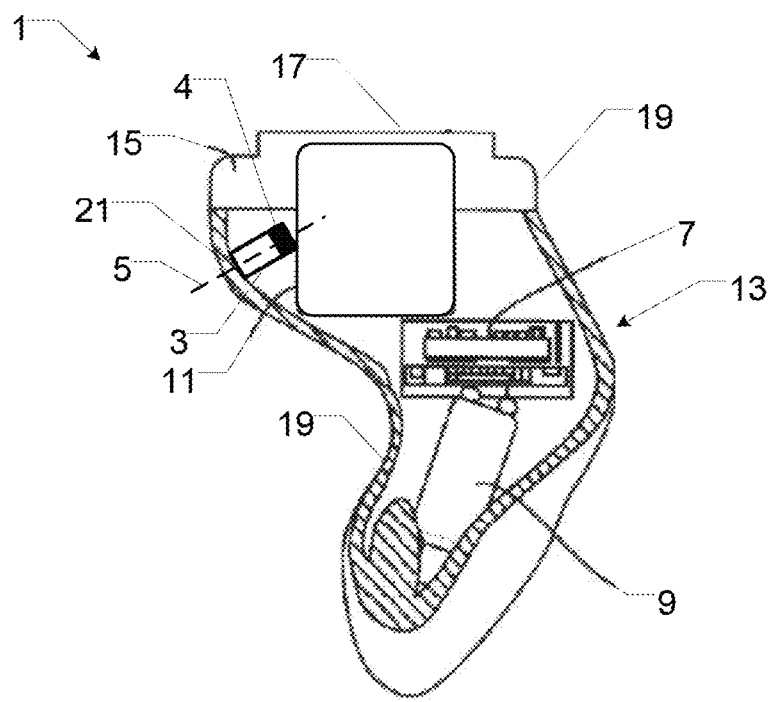

FIGS. 3-5 schematically illustrate a wirelessly rechargeable in-ear hearing device 1, which is made to be positioned at least partly within the ear canal EC of a user. Hearing aids of this type may be those known as invisible-in-canal (IIC), completely-in-canal (CIC), in-the-canal (ITC), or in-the-ear (ITE). To protect the components within it the in-ear hearing device 1 has a shell intended to help keep out ear wax, dirt, water, oil etc. The shell has one or more sidewalls 19 and a faceplate surface 17.

One or more of the sidewalls 19 form an in-ear part 13, which sits at least partially inside the ear canal EC of the user, when the in-ear hearing device 1 is in use. The in-ear part 13 is thus shaped to fit inside an ear canal EC and may be further individually shaped to fit inside the ear canal EC of a particular user. Such an individually shaped in-ear hearing device is known as a custom hearing device and may be made by a process, which entails obtaining a physical or computerized model of the part of the particular user's ear canal.

When the in-ear hearing device 1 is in place within the user's ear canal (EC), the faceplate surface 17 faces towards the outside of the ear canal (EC), i.e. in a direction generally opposite the eardrum. In some models of in-ear hearing devices 1, the faceplate surface 17 will have one or more microphone openings and possibly buttons, switches, etc. with which the user can interact with the in-ear hearing device 1, for example to change settings and/or turn the in-ear hearing device 1 on/off. In the embodiment in FIG. 2, the faceplate surface 17 is the outer surface of a faceplate 15. The faceplate 15 may be very flat or have a significant thickness when compared to the rest of the hearing device. The faceplate may be formed as an integral part or as a separate part of the in-ear hearing device 1.

The one or more sidewalls 19 will usually not contain microphones, buttons, switches, etc. as the one or more sidewalls 19 will typically be adjacent to, or face toward, a part of the user's ear or ear canal, when the in-ear hearing device 1 is in place. If the in-ear hearing device 1 is of a type that is positioned far within the user's ear canal in such a way that it is difficult or near impossible for the user to grab the shell itself for removal, the in-ear hearing device 1 typically comprises a means for aiding in the removal of the in-ear hearing device 1, e.g. a pull out wire 37.

The in-ear hearing device has several hearing device components arranged within the hearing device shell, such as electronics 7 and a receiver 9, i.e. a speaker, where the electronics may be electronic components and circuits that create, process, and/or cancel audible sound. The receiver 9 is typically arranged in the proximal end of the in-ear hearing device 1 such that it is close to the eardrum of the user when the hearing device 1 is inserted into the ear canal EC of the user.

To supply power to at least the electronic components 7, 9 the hearing device 1 has a rechargeable battery 11, which is recharged by inductive charging. To this end, the in-ear hearing device 1 has inductive charging circuitry comprising a receiver coil 3 and means for rectifying an alternating current induced in the receiver coil 3. The receiver coil 3 is not necessarily drawn to scale, but drawn such that its relative position and orientation is apparent.

In the embodiments of a wirelessly rechargeable in-ear hearing device 1 in FIGS. 3-5, the receiver coil 3 is illustrated as a bar coil, but may be any other suitable type of induction coil. A magnetic shielding 4 is shown for illustration as positioned at the end of the bar coil 3 furthest from the adjacent sidewall 21 and extending the diameter of the coil 3. However, the skilled person will know that the magnetic shielding 4 may have a different geometry than that shown to achieve its intended functionality of protecting nearby component from magnetic flux.

In FIGS. 3 and 4, the receiver coil 3 is positioned such that its axial centreline 5 is seen to be substantially parallel to the faceplate 15 and faceplate surface 17. However, the design of the faceplate 15, and possibly the sidewalls, may be different from that shown in FIGS. 3 and 4 such that the receiver coil axial centreline 5 cannot be said to be substantially parallel to the faceplate 15 even though it is in the same position with respect to the rest of the components of the in-ear hearing device 1.

In FIGS. 3-5 the receiver coil 3 is placed next to a side of the battery 11 that does not face the faceplate surface 17.

Advantageously, the receiver coil 3 is positioned such that the closest part of the shell through which the axial centreline 5 points through is not the faceplate surface 17. If the receiver coil 3 were placed, at least partially, in the faceplate 15 and with the axial centreline 5 pointing through the faceplate surface 17, the hearing device 1, and possibly also the faceplate 15, would have to be larger to accommodate the receiver coil 3, particularly when the receiver coil 3 is a bar coil. Further, the associated charger for the wirelessly rechargeable in-ear hearing device 1 would then have to be configured to accommodate the outside of the faceplate geometry, which may contain pull out wire, push buttons, switches etc., in order for a transmitter coil to able to couple to the receiver coil 3. Thus, advantageously, the placement of a bar coil as receiver coil 3 with its axial centreline pointing through an adjacent sidewall 21 allows for the hearing device to have a smaller form factor, and for the associated charger to have fewer design restraints. As will be discussed in connection with FIGS. 7-11, the positioning of the receiver coil 3 adjacent to a hearing device sidewall has the further advantage that the associated charger does not need to have a lid, or, if it has a lid, it does not need to have a transmitter coil in the lid.

A magnetic shielding 4, if present, may be positioned on or near the "back-end" of the receiver coil, i.e. the end of the receiver coil 3 facing away from the outside of the hearing device 1, so as to block and/or divert magnetic flux such that its effect on other components of the hearing device 1 is diminished.

In FIG. 4 is shown an embodiment of the wirelessly rechargeable in-ear hearing device 1 in which the receiver coil 3 is positioned in the faceplate 15, still with the receiver coil axial centreline 5, when extended, pointing through the adjacent hearing device sidewall 21, where in this embodiment the adjacent hearing device sidewall is comprised in the faceplate 15.

In the embodiment of a wirelessly rechargeable in-ear hearing device 1 shown in FIG. 5 the receiver coil 3 is positioned adjacent to a sidewall 21 that curves.

In any embodiment, the receiver coil 3 may advantageously be positioned adjacent to a sidewall 21, which is at least in part shaped to be positioned near a common feature of the human ear as such a shape will appear in many in-ear hearing devices, including those with custom shaped shells. For example, in a preferred embodiment, the receiver coil 3, is positioned adjacent to a hearing device sidewall 21, which is configured to being positioned adjacent to the tragus, anti-tragus and/or intertragal notch of the user's ear, see FIG. 1B, when the in-ear part 13 is positioned within the ear canal EC. The tragus, anti-tragus and intertragal notch are common features of the human ear. Positioning the receiver coil 3 adjacent to a common feature allows for the same internal architecture of the hearing device 1 to be used between models, types and/or custom hearing devices individualized for different users even though the shape of the rest of the shell in the different devices is dissimilar.

Figure 6A:
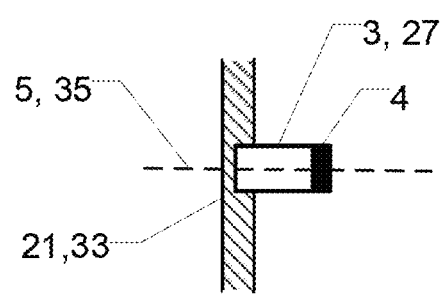
Figure 6B:
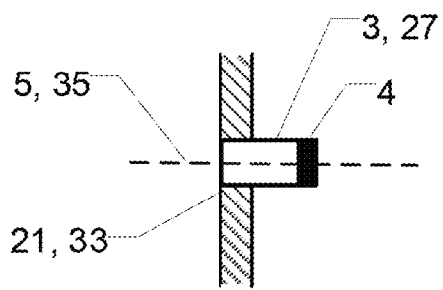

FIGS. 6A and 6B show alternative positioning of the receiver or transmitter coil 3, 27 in relation to the adjacent sidewall 21, 33. In all embodiments, the receiver coil 3/transmitter coil 27 is positioned adjacent to one of the one or more sidewalls, which is denoted as the adjacent hearing device sidewall 21, 33, and positioned such that the induction coil axial centreline 5, 35 points through the adjacent sidewall 21, 33. Instead of being positioned beside the adjacent sidewall 21, 33 as shown in previous figures, the induction coil 3, 27 may be placed in an indent in the adjacent sidewall 21, 33, as shown in FIG. 6A, or in a through-hole in the adjacent sidewall 21, 33, as shown in FIG. 6B. If placed in a through-hole, the induction coil 3, 27, to protect it from the environment outside the hearing device 1 or charger 25, may have a protective coating and/or be covered by a lacquer.

Figure 7:
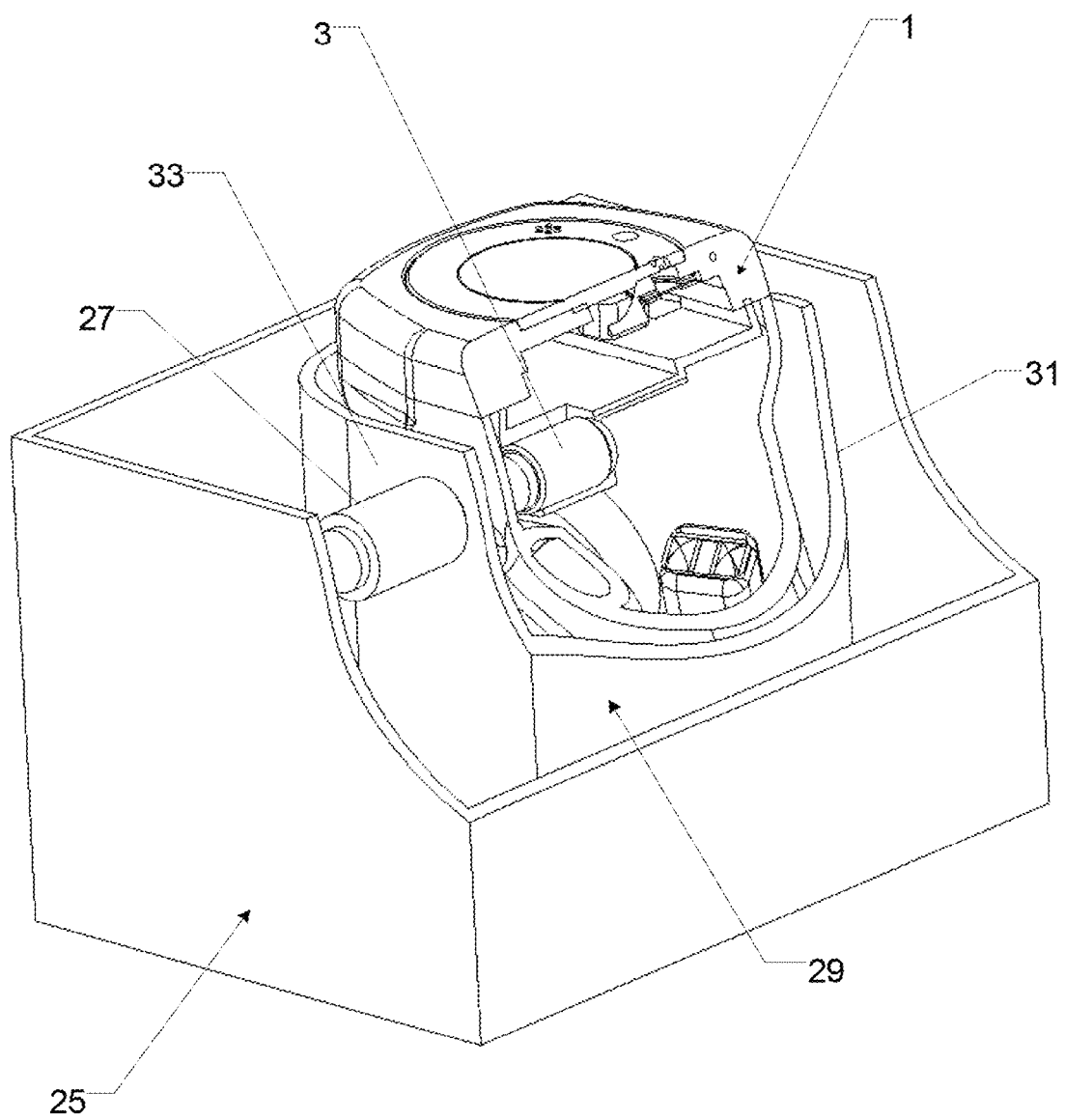
FIG. 7 shows a cut-away of a wirelessly rechargeable in-ear hearing device placed within a charger for a wirelessly rechargeable in-ear hearing device in accordance with exemplary embodiments of the invention, FIG. 8 schematically illustrates a charger for a wirelessly rechargeable in-ear hearing device in accordance with exemplary embodiments of the invention, FIG. 9 schematically illustrates a system with a charger for a wirelessly rechargeable in-ear hearing device and two wirelessly rechargeable in-ear hearing devices in accordance with exemplary embodiments of the invention, FIG. 10 schematically illustrates a charger for a wirelessly rechargeable in-ear hearing device in accordance with exemplary embodiments of the invention, and FIG. 11 schematically illustrates a system with a charger for a wirelessly rechargeable in-ear hearing device and a wirelessly rechargeable in-ear hearing device in accordance with exemplary embodiments of the invention.

FIG. 7 shows a cut-away of a wirelessly rechargeable in-ear hearing device 1 placed within a charger 25. The charger 25 has a holder 29 with one or more holder sidewalls 31 made to support the shape of the in-ear hearing device 1 in a predetermined position.

Inductive charging circuitry within the charger 25 comprises a transmitter coil 27, which is defined by a transmitter coil axial centreline 35 and a transmitter coil diameter. The transmitter coil 27 is shown as a bar coil, but may be any suitable type of coil. The transmitter coil 27 is positioned adjacent to a holder sidewall 33 with the transmitter coil axial centreline pointing through the adjacent holder sidewall 33. The adjacent holder sidewall 33 is configured to being adjacent to a sidewall of the hearing device 1, when the charger 25 is in use and the in-ear hearing device 1 is in the predetermined position.

Thus, the holder 29 has a specific shape, which allows for the transmitter coil 27 to be able to inductively couple to a receiver coil 3 in the in-ear hearing device 1. The holder may be moulded to at least partly be in the shape of or to support the shape of the in-ear part 13 of a hearing device 1 or of a custom hearing device.

In FIG. 7 is shown the receiver coil 3 of the in-ear hearing device 1 positioned adjacent to one of the hearing device sidewalls 21 with the receiver coil axial centreline 5 going through the adjacent hearing device sidewall 21 and such that the receiver coil 3 is aligned with the transmitter coil 27 of the charger 5.

The transmitter coil 27 is positioned within the base of the charger 25, which means that the charger can be made without a lid or that the lid does not need to have charging circuitry, which reduces the complexity and cost of the charger.

As described above in connection with the receiver coil 3, the transmitter coil 27 may be placed in an indent in the adjacent holder sidewall 33, as shown in FIG. 5A, or in a through-hole in the adjacent holder sidewall 33, as shown in FIG. 5B. If placed in a through-hole, the transmitter coil 27, to protect it from the environment outside the charger 25, may have a protective coating and/or be covered by a lacquer.

Figure 8:
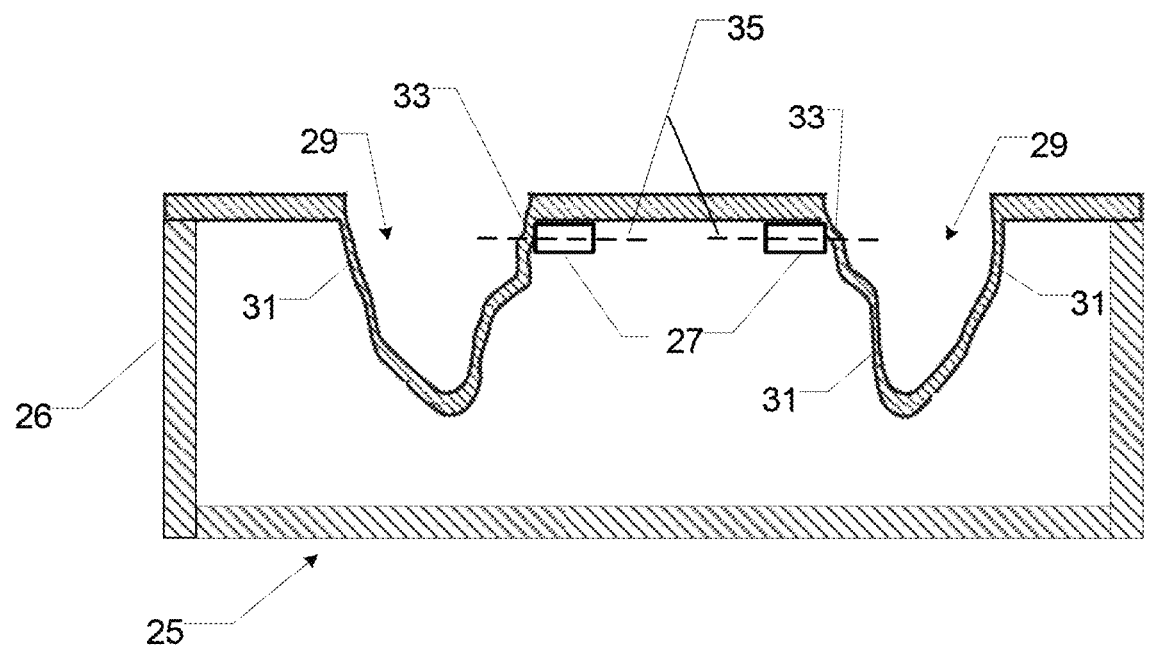

FIG. 8 schematically illustrates a charger 25 for a wirelessly rechargeable in-ear hearing device 1. The charger casing 26 in FIG. 8 has two holders 29, where one is shaped to hold an in-ear hearing device 1 configured for a left ear canal and the other holder is shaped to hold an in-ear hearing device 1 configured for a right ear canal. The holders 29 each have one or more sidewalls 31, which are configured to support the shape of an in-ear hearing device 1. The configuration of the one or more sidewalls 31 is precise enough so that the in-ear hearing device 1 fits properly into the holder in at least one predetermined position.

The charger 25 has inductive charging circuitry with a transmitter coil 27, where the transmitter coil 27 sits adjacent to a holder sidewall and is positioned such that its axial centreline 35, when extended, passes through the adjacent holder sidewall 33. To enable the transmitter coil 27 to inductively couple to a receiver coil in a hearing device, the sidewall 33, which the transmitter coil 27 is adjacent to, is shaped such that a hearing device sidewall is adjacent to it when the charger is in use and the hearing device sits in the holder 29 in the predetermined position. The holders 29 are shaped such that the in-ear part 13 of a hearing device 1 is put in first and the end with the faceplate surface 17 sticks out of the holder 29. The charger 29 may simply be this base unit with the charging circuitry or the charger 29 could have a lid to go on top of the base unit.

Figure 9:
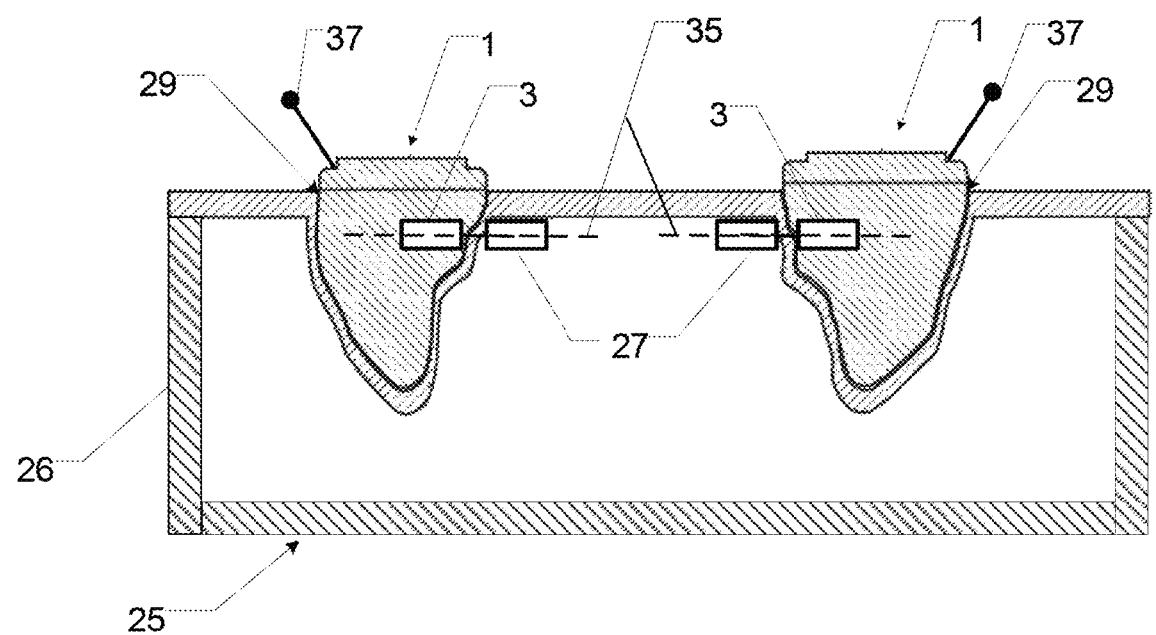

In FIG. 9 is shown schematically a system with a charger 25 for a wirelessly rechargeable in-ear hearing device 1 with two wirelessly rechargeable in-ear hearing devices positioned within two holders 29 of the charger 25. The charger 25 could be the same charger as the one shown in FIG. 8.

A receiver coil 3 in an in-ear hearing devices 1 and a transmitter coils 27 in the charger 25 are positioned such that the coils can inductively couple to each other so that each hearing device can charge wirelessly. Each holder 29 is configured to hold a hearing device 1 in a predetermined position, i.e. in a specific orientation, such that the receiver coils 3 can align with the transmitter coils 27. Thus, the one or more holder sidewalls 31 will be shaped to fit closely to the shape of part of the hearing device 1. In the embodiment of FIG. 9, the one or more holder sidewalls 31 fit closely to most of the in-ear part 3 of the hearing device 1, but the holder sidewalls 31 could alternatively fit less closely to parts of the hearing device 1.

When a hearing device 1 is positioned in the charger 25 in the predetermined position and is charging, a visual and/or audible signal may be provided to alert and/or inform the user. For example, one or more LEDs on the charger 25 and/or on the hearing device 1 may light up to indicate charging and possibly how much the hearing device 1 has been recharged.

Figure 10:
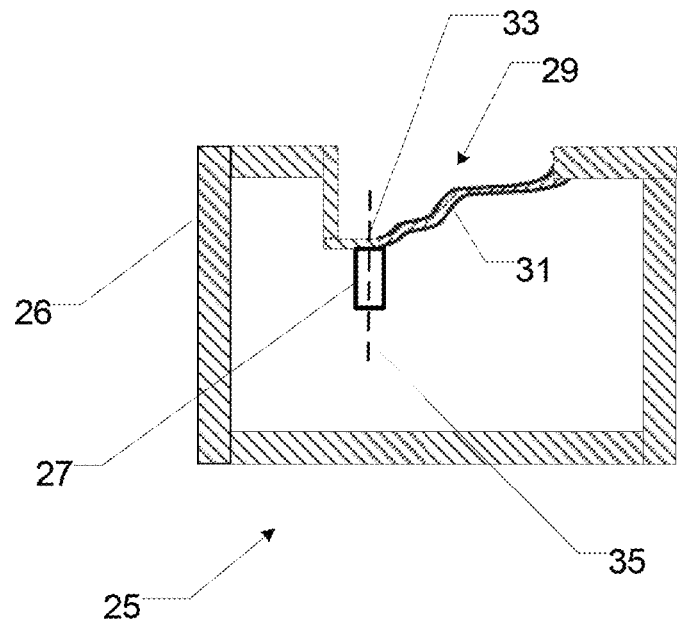

FIG. 10 schematically illustrates a charger 25 for a wirelessly rechargeable in-ear hearing device 1. The charger casing 26 in FIG. 10 has a single holder 29, which is shaped to hold an in-ear hearing device 1. The holder 29 has one or more sidewalls 31, which are configured to support the shape of the in-ear hearing device 1. The configuration of the one or more sidewalls 31 is precise enough so that the in-ear hearing device 1 fits properly into the holder in at least one predetermined position.

The charger 25 has inductive charging circuitry with a transmitter coil 27, where the transmitter coil 27 sits adjacent to a holder sidewall and is positioned such that its axial centreline 35 is going through the adjacent holder sidewall 33. To enable the transmitter coil 27 to inductively couple to a receiver coil in a hearing device, the sidewall 33, which the transmitter coil 27 is adjacent to, is shaped such that a hearing device sidewall is adjacent to it when the charger is in use and a hearing device sits in the holder 29 in the predetermined position. The holder 29 is shaped such that the hearing device fits properly into it when lying on its side.

Figure 11:
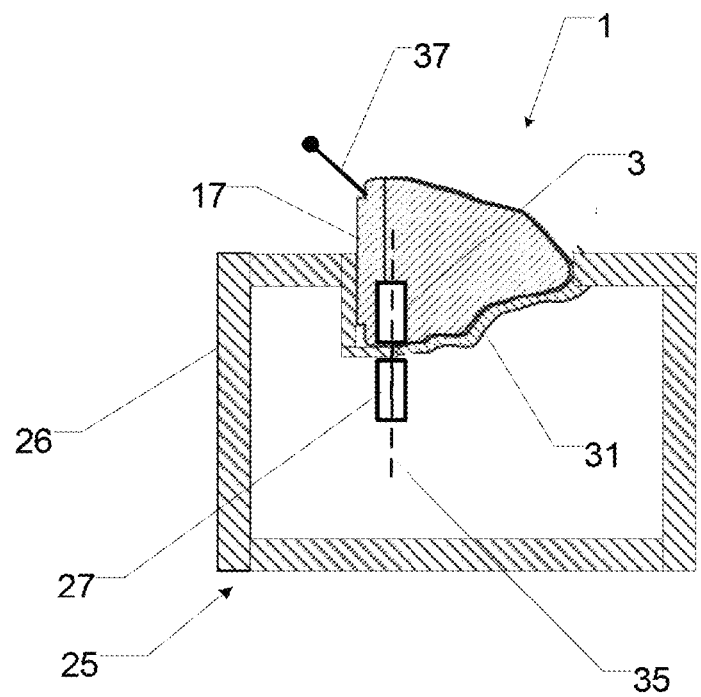

FIG. 11 shows schematically a system with a charger 25 for a wirelessly rechargeable in-ear hearing device 1 with an in-ear hearing device positioned within the holder 29 of the charger 25. The charger 25 could be the same charger as the one shown in FIG. 10.

In the example shown in FIG. 11, the faceplate surface 17 of the hearing device 1 is partially covered by one or more sidewalls 31 of the holder, when the hearing device 1 is positioned in the charger 25 in the predetermined position.

A receiver coil 3 in the in-ear hearing devices 1 and a transmitter coils 27 in the charger 25 are both positioned such that the receiver and transmitter coil can inductively couple to each other so that the hearing device 1 can charge wirelessly. The holder 29 is configured to hold a hearing device 1 in a predetermined position, i.e. in a specific orientation, such that the receiver coil 3 can align with the transmitter coil 27. Thus, the one or more holder sidewalls 31 will be shaped to fit closely to the shape of part of the hearing device 1. In the embodiment of FIG. 11, the one or more holder sidewalls 31 fit closely to some of the in-ear part 3 of the hearing device 1 and some of the faceplate surface 17, but this is just one example of the ways the holder sidewalls 31 could fit closely to at least part of the hearing device 1 to enable the coils to inductively couple.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES

1 Wirelessly rechargeable in-ear hearing device
3 Receiver coil
4 Magnetic shielding
5 Receiver coil axial centreline
7 Hearing device electronics
9 Receiver
11 Rechargeable battery
13 In-ear part
15 Faceplate
17 Faceplate surface
19 Hearing device sidewall
21 Adjacent hearing device sidewall
25 Charger
26 Charger casing
27 Transmitter coil
29 Holder
31 Holder sidewalls
33 Adjacent holder sidewall
35 Transmitter coil axial centreline
37 Pull out wire
AT Anti-tragus
EC Ear canal
ED Eardrum
IN Intertragal notch
P Pinna
T Tragus

The invention claimed is:

1. A wirelessly rechargeable in-ear hearing device comprising:
a shell having one or more hearing device sidewalls and a faceplate surface;
a rechargeable battery;
one or more hearing device components; and
inductive charging circuitry comprising a receiver coil having a receiver coil axial centreline and a receiver coil diameter;
wherein the one or more of the hearing device sidewalls at least partially forms an in-ear part configured to be placed at least partially inside an ear canal of a user;
wherein the faceplate surface is configured to be oriented towards an outside of an ear of the user, when the in-ear part is positioned at least partially inside the ear canal; and wherein the receiver coil axial centreline points through one of the one or more hearing device sidewalls.

2. The wirelessly rechargeable in-ear hearing device according to claim 1, wherein the receiver coil is configured to inductively couple to a transmitter coil.

3. The wirelessly rechargeable in-ear hearing device according to claim 1, wherein the receiver coil is positioned next to a side of the rechargeable battery that does not face the faceplate surface.

4. The wirelessly rechargeable in-ear hearing device according to claim 1, wherein the receiver coil is a bar coil.

5. The wirelessly rechargeable in-ear hearing device according to claim 1, wherein the receiver coil axial centreline has an angle that is anywhere between 75 to 105 degrees with respect to the one of the one or more hearing device sidewalls.

6. The wirelessly rechargeable in-ear hearing device according to claim 5, wherein the receiver coil axial centreline has an angle that is anywhere between 80 to 100 degrees with respect to the one of the one or more hearing device sidewalls.

7. The wirelessly rechargeable in-ear hearing device according to claim 1, wherein the receiver coil is directly next to the one of the one or more hearing device sidewalls.

8. The wirelessly rechargeable in-ear hearing device according to claim 1, wherein the one or more hearing device sidewalls comprises multiple sidewalls, the multiple sidewalls being respective wall portions of a continuous wall, and wherein the one of the one or more hearing device sidewalls through which the receiver coil axial centreline points is one of the wall portions that is the closest to the receiver coil.

9. The wirelessly rechargeable in-ear hearing device according to claim 1, wherein the one of the one or more hearing device sidewalls comprises a tragal hearing device sidewall configured to be positioned in correspondence with a tragus, anti-tragus, and/or intertragal notch of the ear of the user, when the in-ear part is positioned at least partly within the ear canal, and wherein the receiver coil axial centreline points through the tragal hearing device sidewall.

10. The wirelessly rechargeable in-ear hearing device according to claim 1, wherein the in-ear hearing device is a custom hearing device.

11. A charger for a wirelessly rechargeable in-ear hearing device comprising:
    a charger casing;
    inductive charging circuitry in the charger casing, the inductive charging circuitry comprising a transmitter coil, the transmitter coil having a transmitter coil axial centreline and a transmitter coil diameter; and
    a holder comprising one or more holder sidewalls, the holder configured to receive the in-ear hearing device and to support the in-ear hearing device in a predetermined position;
    wherein the transmitter coil axial centreline points through one of the one or more holder sidewalls.

12. The charger according to claim 11, wherein the transmitter coil is configured to inductively couple to a receiver coil.

13. The charger according to claim 11, wherein the transmitter coil is a bar coil.

14. The charger according to claim 11, wherein the transmitter coil axial centreline has an angle that is anywhere between 75 to 105 degrees with respect to the one of the one or more holder sidewalls.

15. The charger according to claim 11, wherein the transmitter coil axial centreline has an angle that is anywhere between 80 to 100 degrees with respect to the one of the one or more holder sidewalls.

16. The charger according to claim 11, wherein the wirelessly rechargeable in-ear hearing device is a custom hearing device, and wherein the holder is a moulded holder that corresponds to the shape of the custom hearing device.

17. The charger according to claim 11, wherein the transmitter coil is directly next to the one of the one or more holder sidewalls.

18. The charger according to claim 11, wherein the one of the one or more holder sidewalls is configured to face towards a hearing device sidewall of the in-ear hearing device, when the in-ear hearing device is supported by the holder in the predetermined position.

19. The charger according to claim 11, wherein the one or more holder sidewalls comprises multiple sidewalls, the multiple sidewalls being respective wall portions of a continuous wall, and wherein the one of the one or more holder sidewalls through which the transmitter coil axial centreline points is one of the wall portions that is the closest to the transmitter coil.

20. A system comprising the charger of claim 11, and the wirelessly rechargeable in-ear hearing device.

21. The system according to claim 20, wherein the in-ear hearing device comprises:
    a shell having one or more hearing device sidewalls and a faceplate surface;
    a rechargeable battery;
    one or more hearing device components; and
    inductive charging circuitry comprising a receiver coil having a receiver coil axial centreline and a receiver coil diameter;
    wherein the one or more of the hearing device sidewalls at least partially forms an in-ear part configured to be placed at least partially inside an ear canal of a user;
    wherein the faceplate surface is configured to be oriented towards an outside of an ear of the user, when the in-ear part is positioned at least partially inside the ear canal; and
    wherein the receiver coil axial centreline points through one of the one or more hearing device sidewalls.

22. The system according to claim 21, wherein the receiver coil in the wirelessly rechargeable in-ear hearing device and the transmitter coil in the charger are positioned such that the receiver coil is able to inductively couple to the transmitter coil, when the wirelessly rechargeable in-ear hearing device is placed in the holder in the predetermined position.

23. The system according to claim 21, wherein a centre of mass of the receiver coil and a centre of mass of the transmitter coil is less than or equal to 5.0 mm when the wirelessly rechargeable in-ear hearing device is placed in the holder in the predetermined position.

24. The system according to claim 21, wherein a centre of mass of the receiver coil and a centre of mass of the transmitter coil is less than or equal to 2.0 mm when the wirelessly rechargeable in-ear hearing device is placed in the holder in the predetermined position.

25. The system according to claim 21, wherein the receiver coil diameter is smaller than the transmitter coil diameter.

* * * * *